United States Patent [19]

Leroy

[11] 4,412,430
[45] Nov. 1, 1983

[54] INFLATABLE-STRUCTURE APPARATUS FOR COOLING A HEAT EXCHANGE FLUID

[75] Inventor: Claude Leroy, Marseilles, France

[73] Assignee: Sorelec, Loiret, France

[21] Appl. No.: 384,370

[22] Filed: Jun. 2, 1982

[30] Foreign Application Priority Data

Aug. 24, 1981 [FR] France .................... 81 16185

[51] Int. Cl.³ .............................................. F25B 23/00
[52] U.S. Cl. .................. 62/467 R; 62/235.1; 126/443
[58] Field of Search .................... 62/235.1, 467 R; 126/443

[56] References Cited

U.S. PATENT DOCUMENTS

| | | | |
|---|---|---|---|
| 3,043,112 | 7/1962 | Head | 62/467 R |
| 3,310,102 | 3/1967 | Trombe | 62/467 R |
| 3,422,886 | 1/1969 | Buller | 62/467 R |
| 4,137,903 | 2/1979 | Annett | 126/443 |
| 4,147,040 | 4/1979 | Altman | 62/467 R |

Primary Examiner—Ronald C. Capossela
Attorney, Agent, or Firm—Seidel, Gonda & Goldhammer

[57] ABSTRACT

This invention concerns an inflatable-structure apparatus for cooling a heat exchange fluid comprising a flexible cylindrical casing of plastic material which is permeable to infra-red rays, said casing being maintained in its cylindrical form by an increased internal pressure, while disposed within said casing is a wall means which is reflective in the direction of the outer casing and over which flows the heat exchange fluid to be cooled, which is supplied to the interior of the casing by way of a supply duct and is removed therefrom by way of a discharge duct to be recycled by a pump, passing through a buffer tank.

4 Claims, 3 Drawing Figures

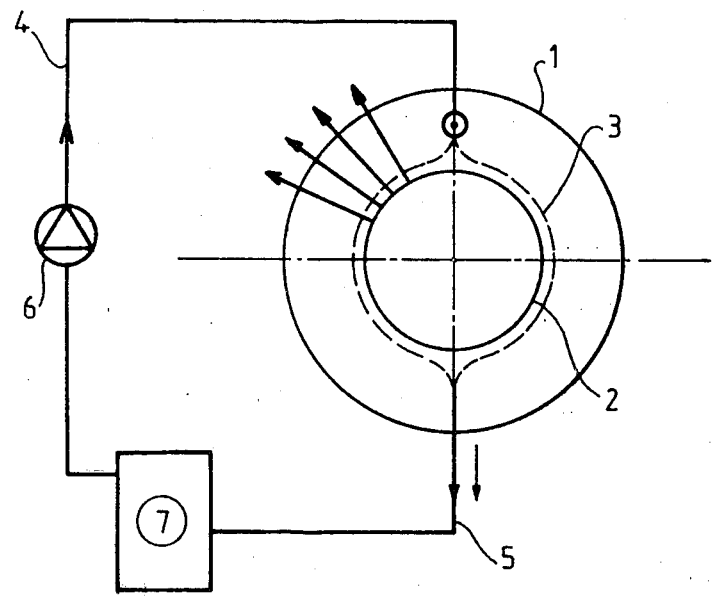
FIG_1
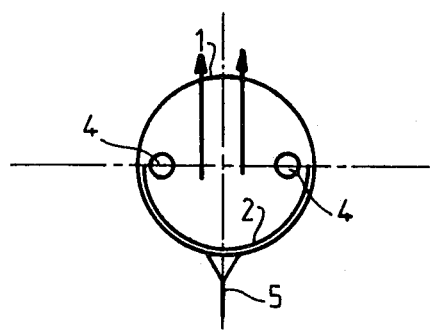
FIG_2
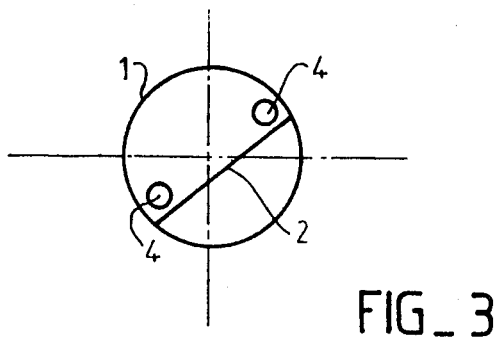
FIG_3

INFLATABLE-STRUCTURE APPARATUS FOR COOLING A HEAT EXCHANGE FLUID

The present invention relates to an inflatable-structure apparatus for cooling a heat exchange fluid.

The production of cold by using solar radiation is generally effected by means of absorption-type machines in which evaporation of the fluid is maintained by the heat of the sun. Because of the difficulties which arise in hot countries, in regard to cooling the condenser, in order to heat the evaporator it is necessary to have recourse to concentration-type solar collectors in order to increase the temperature of the evaporator.

However, the efficiency of the installations in question would be further substantially improved if the problem of cooling the condenser in hot countries could be overcome.

The aim of the present invention is accordingly to provide an apparatus for cooling a heat exchange fluid by natural nocturnal radiation by means of an inflatable structure which can be employed in association with the inflatable-structure solar collectors which are also patented by the present applicants, using the shadow areas cast by the solar collectors and thus providing for optimum utilization of the sun-lit surface.

The inflatable-structure apparatus for cooling a heat exchange fluid, in accordance with the present invention, is characterized in that it essentially comprises a flexible cylindrical casing of plastic material which is permeable to infra-red rays, said casing being maintained in its cylindrical form by an increased internal pressure, while disposed within said casing is a wall means which is reflective in respect of infra-red radiation in the direction of the outer casing and over which flows the heat exchange fluid to be cooled, which is supplied to the interior of the casing by way of a supply duct and is removed therefrom by way of a discharge duct to be recycled by a pump, passing through a buffer tank.

The heat exchange fluid which is cooled during the night by using the above-defined apparatus is stored in a buffer tank and is used during the daytime to cool the condenser of the installations involved, for example cold-production installations, using solar energy.

The invention will now be described in greater detail with reference to embodiments given by way of example and illustrated in the accompanying drawings in which:

FIG. 1 is a diagrammatic view in cross-section of an apparatus according to the invention, FIG. 2 is a diagrammatic view in cross-section of a first alternative form of the apparatus according to the invention, and FIG. 3 is a diagrammatic view in cross-section of a second alternative embodiment of the apparatus according to the invention.

The apparatus according to the invention substantially comprises an outer flexible cylindrical casing 1 of plastic material which is permeable to infra-red radiation, such as high-density polyethylene, which is maintained in its cylindrical shape by an increased internal pressure $P_1$. Disposed within the casing 1, coaxially with the casing 1, is a flexible cylindrical casing 2 of plastic material. Disposed on the inside surface of the wall means of the inner casing 2 is a coating, for example a deposit of aluminium, for reflecting the infra-red radiation towards the outer casing 1. The second flexible cylindrical casing 2 is held in shape by an increased internal pressure $P_2$ which is higher than the pressure $P_1$. Supply ducts 4 are provided to supply a heat exchange fluid to the vicinity of the upper generatrix of the outer casing 1, the heat exchange fluid then flowing over the inner cylindrical casing 2 and being cooled in the course of that flow by nocturnal radiation towards the atmosphere through the outer casing 1, and for reflecting infra-red rays to the outside of the casing 1. The heat exchange fluid which is cooled in the above-described manner collects in the vicinity of the lower generatrix of the outer casing 1 and is discharged by way of a discharge duct 5, and passes into a buffer tank or reservoir 7, to be recycled in the duct 4 by means of a pump 6. The volume of heat exchange fluid contained in the buffer tank 7 is thus recycled during the night and is progressively cooled to temperatures which are below the ambient outside temperature which may be particularly low in desert countries. The reserve of heat exchange fluid which is thus cooled is used during the period of daytime sunlight to cool the condenser of installations using solar energy.

The above-described cooling apparatus is an apparatus which is entirely static, and which is very light. Use of the apparatus is extremely simple since this involves inflating the structures and connecting the recycling installation to sealing connecting means which are already provided in advance. Transporting such an apparatus in its uncompressed and folded form does not give rise to any problems.

FIG. 2 shows an alternative form of the apparatus according to the invention, in which the internal flexible cylindrical casing is omitted and the reflective surface 2 is applied directly to the lower inside surface of the flexible cylindrical casing 1.

FIG. 3 shows a second alternative form of the apparatus according to the invention, in which the reflective surface 2 is applied to an inclined plate which is disposed in a diametral plane of the flexible cylindrical casing 1.

It will be appreciated that steps are taken in all these alternative embodiments to provide for thermal insulation in respect of the buffer tank 7 in order to ensure that the cooled heat exchange fluid does not heat up again too quickly.

I claim:

1. An apparatus for cooling a heat exchange fluid, comprising a first inflatable, flexible, cylindrical casing of plastic material which is permeable to infra-red rays, said casing being maintained in its cylindrical form by an increased internal pressure, a wall means disposed within said casing, said wall means being reflective in the direction of said casing and over which flows the heat exchange fluid to be cooled, a supply duct for supplying the heat exchange fluid to the interior of said casing and a discharge duct for removing the heat exchange fluid from the interior of said casing.

2. Apparatus according to claim 1 wherein the reflective surface is formed by a coating on the inside surface of a second inflatable, flexible, cylindrical casing of plastic material, said second casing being coaxial with respect to the first flexible cylindrical casing, said second casing being maintained in its cylindrical form by an increased internal pressure which is greater than the internal pressure between said second casing carrying the reflective surface and the first outer casing.

3. Apparatus according to claim 1 wherein the reflective surface is formed by a coating on the lower part of the inside surface of the flexible cylindrical casing.

4. Apparatus according to claim 1 wherein the reflective surface is carried by an inclined plate disposed in the flexible cylindrical casing on a diametral plane.

* * * * *